June 17, 1941.  R. F. BERGMANN ET AL  2,245,564
SPINDLE LUBRICATING MEANS
Filed Feb. 29, 1940  3 Sheets-Sheet 1
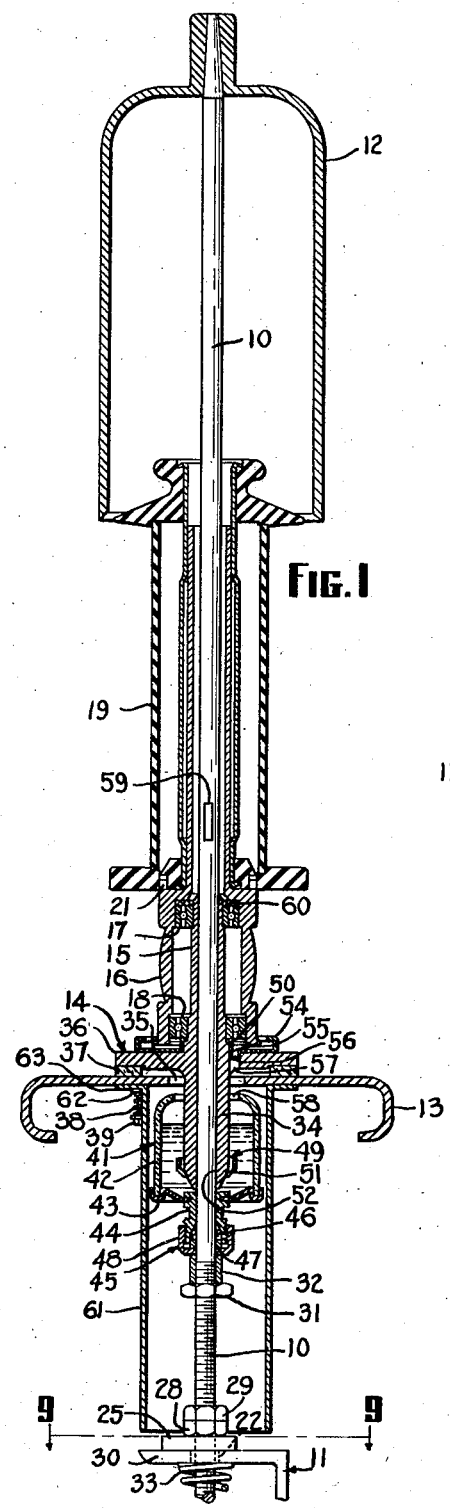
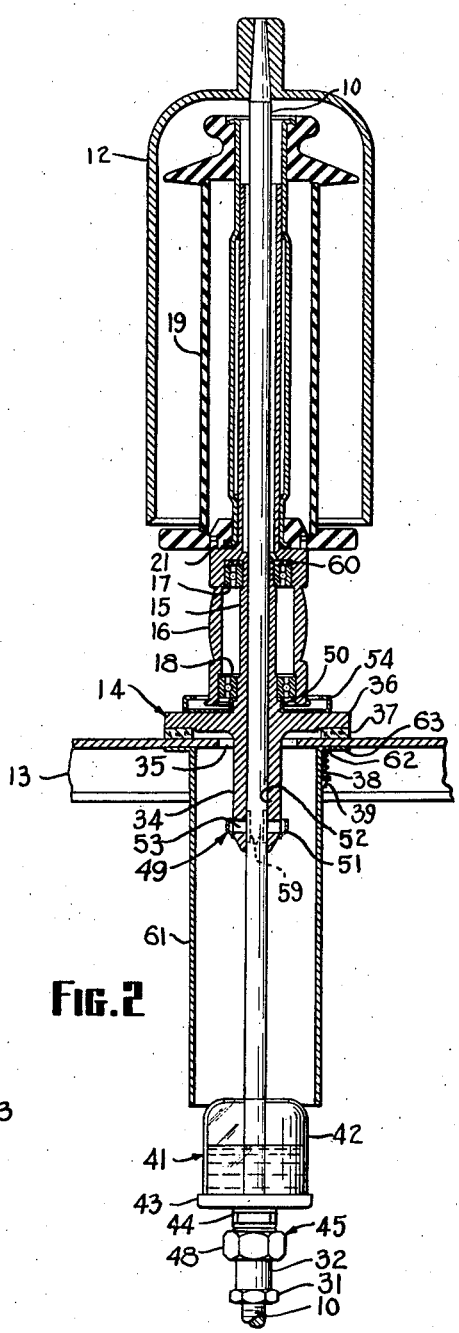
Inventors
RICHARD F. BERGMANN AND
CLARENCE C. WALTERS
Charles O. Herrstrom
Attorney

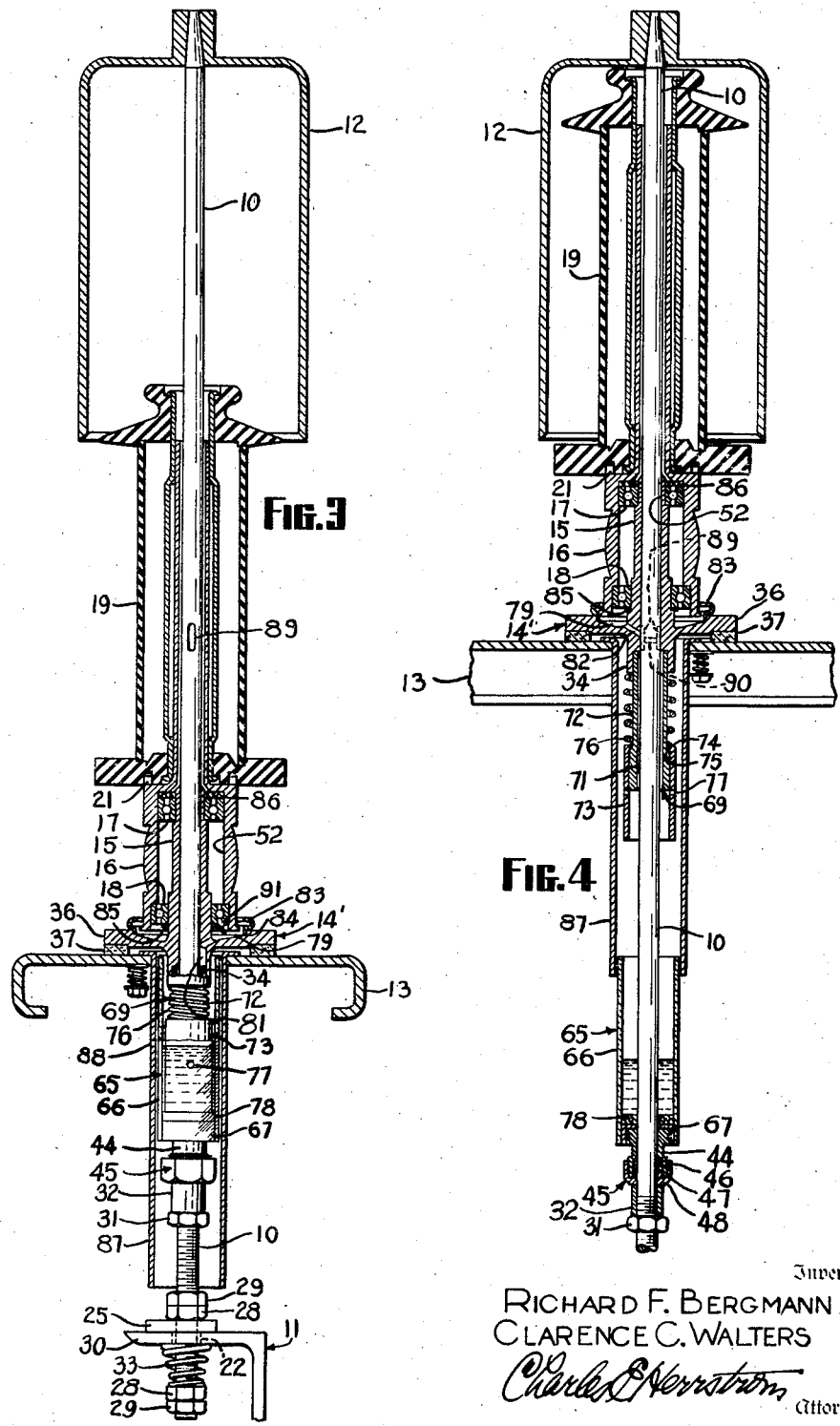

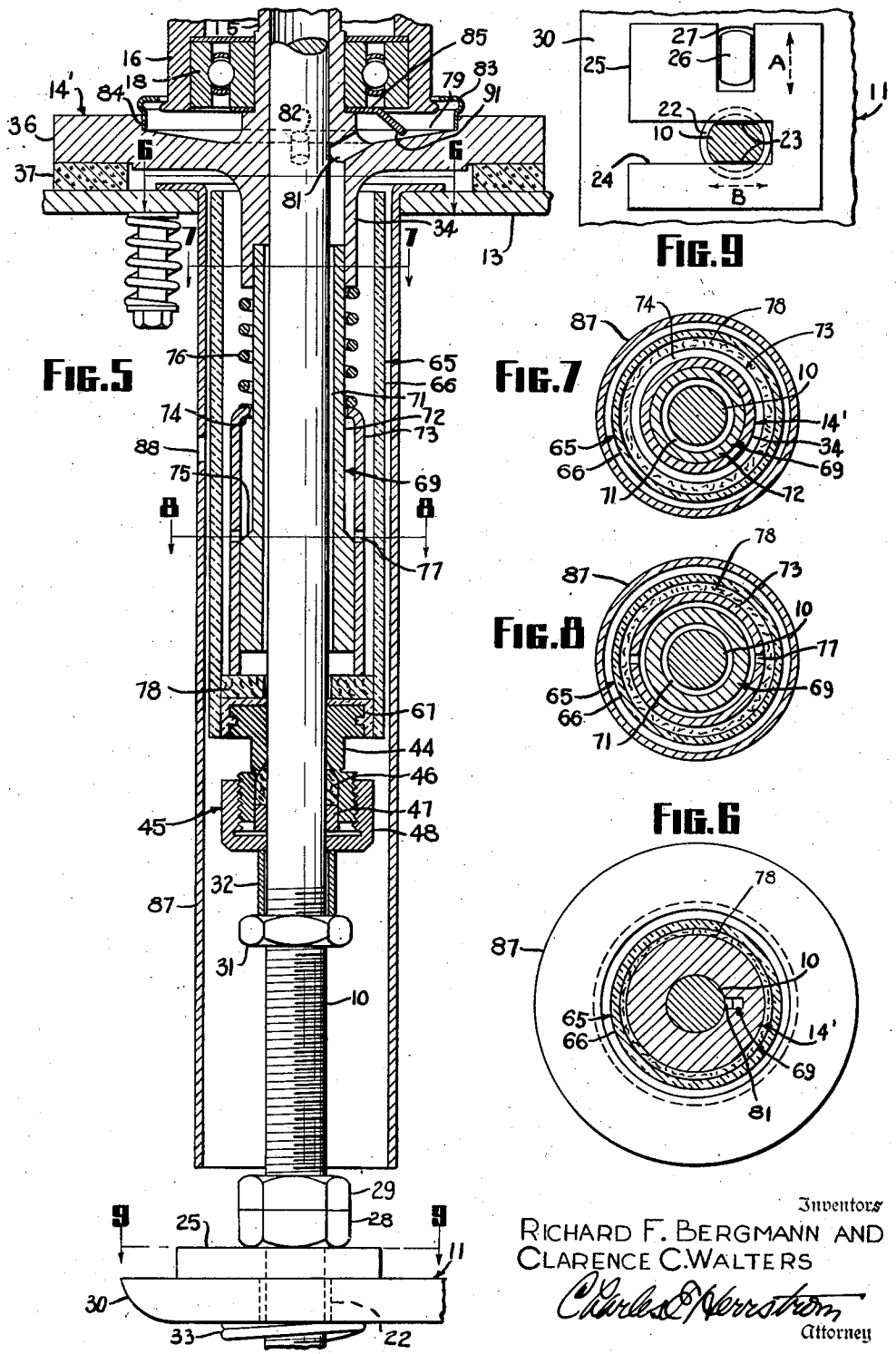

Patented June 17, 1941

2,245,564

UNITED STATES PATENT OFFICE 2,245,564

SPINDLE LUBRICATING MEANS

Richard F. Bergmann, Lakewood, and Clarence C. Walters, Fairview Village, Ohio, assignors to Industrial Rayon Corporation, Cleveland, Ohio, a corporation of Delaware Application February 29, 1940, Serial No. 321,488

19 Claims. (Cl. 57—133)

This invention relates to improved means for insuring positive lubrication of mechanisms involving simultaneous reciprocatory and rotational motion of the component parts thereof. More particularly, it relates to means for lubricating a mechanism including a spindle about which a rotatable sleeve is mounted in a manner permitting relative reciprocation of the sleeve and spindle. While the concept of the invention is readily capable of adaptation to many kindred forms of apparatus, the present application is especially concerned with the applicability of such lubricating means to spinning, twisting or doubling machinery such, for example, as cap-spinning apparatus.

Anyone cognizant of the difficulties experienced in the continuous operation of such equipment is well aware of the tremendous maintenance costs involved in the repair and replacement of parts damaged as a result of inadequate lubrication. Due to the increasingly high speeds of operation of twisting frames and cap-spinning apparatus devoted to the twisting and packaging of thread or the like, the problem of adequately lubricating the rapidly moving parts thereof has become more and more difficult. Most of the devices known to the art possess shortcomings in consequence of which they fail to answer satisfactorily the exacting lubrication requirements imposed by the desideratum of preventing excessive frictional wear of the parts of the apparatus.

In many prior art devices, even though the supply of lubricant originally provided is sufficient at the outset, leakage from the supply source results in rapid depletion of the available lubricating medium. In others, loss of lubricating medium is brought about by the splashing or throwing of the lubricant as a result of high speed operation, an attribute which is particularly disadvantageous in the manufacture of thread or the like in view of the fact that the quality of the product is adversely affected by contamination. In both cases, the concomitant inconvenience involved in keeping the apparatus clean is overshadowed by the danger to the operator occasioned by floors made slippery by the presence of lubricant. In any even, close attendance upon the apparatus is imperative to prevent breakdowns consequent upon insufficient lubrication.

These difficulties the present invention overcomes by providing upon the spindle a lubricant reservoir from which, by reason of relative reciprocation of the spindle and the sleeve, lubricant may be delivered to the bearing surfaces of the apparatus; at the same time, means are provided for directing the lubricant back to the reservoir for recirculation. By mounting a suitable container upon the spindle, an adequate supply of lubricating medium may be maintained with little, if any, loss of lubricant due to splashing or leakage. In the interests of the safety of the operator, an enclosure is employed to surround certain of the moving parts devoted to lubrication of the apparatus.

Although, as indicated, the invention is applicable to numerous mechanisms of similar character, the accompanying drawings illustrate two preferred embodiments of the invention.

Figure 1 represents a sectional elevation of a cap-spinning frame showing the lifting rail in its lowermost position. Figure 2 is a sectional elevation taken at right angles to the plane of the section shown in Figure 1, the lifting rail being shown in the uppermost position of its reciprocatory cycle. Figure 3, which corresponds generally to Figure 1, represents a sectional elevation of another embodiment of the invention the principle of which is generally similar to that of the apparatus of Figures 1 and 2. Figure 4, which corresponds generally to Figure 2, illustrates a sectional elevation of the apparatus of Figure 3.

Figure 5 is a partial sectional elevation on an enlarged scale of the portion of the device of Figures 3 and 4 devoted to the function of effecting lubrication of the cap-spinning apparatus. Figure 6 represents a horizontal section from line 6—6 of Figure 5. Figure 7 is a sectional plan of the apparatus of Figure 5 as seen from line 7—7. Figure 8 is a horizontal section taken from line 8—8 of Figure 5. Figure 9, which is a sectional plan from line 9—9 of Figure 5, may also be taken to be a sectional plan from line 9—9 of Figure 1.

In the embodiment of the invention illustrated in Figure 1, spindle 10 serves to support cap 12, being resiliently mounted upon fixed rail 11 in a manner similar to that shown, described and claimed in Jordan et al. Patent No. 2,135,519, granted November 8, 1938. Lifting rail 13, which imparts reciprocatory motion to the apparatus, carries a resiliently mounted bolster 14 which is slidable longitudinally of spindle 10. By means of antifriction bearings 17 and 18, bolster 14 supports a rotatable whirl 16 upon sleeve portion 15. Whirl 16, which is driven by suitable means, such, for example, as a belt, supports a bobbin 19 held in place by pins 21.

Spindle 10 extends through a hole 22 of slightly larger diameter than said spindle in outstanding leg 30 of fixed rail 11. The lower portion of spindle 10 is threaded to accommodate stop nuts 28 and jam nuts 29 positioned above and below leg 30 of fixed rail 11. On the upper side of said leg 30 is disposed a washer plate 25 urged thereagainst by the action of spring 33. As shown in Figure 9, a portion of spindle 10 just above leg 30 is provided with two parallel flattened portions 23 which engage slot 24 of washer plate 25. A T-head bolt 26 threaded into leg 30 cooperates with slot 27 to maintain washer plate 25 in fixed position.

It is desirable, but not necessary, to provide lifting rail 13 with a mounting for bolster 14 of the kind illustrated in Figure 1 of the drawings. Sleeve portion 15 of bolster 14 extends above lifting rail 13 while butt portion 34 extends downward through a hole 35 in lifting rail 13 of considerably larger diameter than said butt portion. A flanged portion 36 on bolster 14 bears against a resilient washer 37 encircling hole 35 which washer is conveniently made of some flexible material as cork, rubber, leather or the like. Flanged portion 36 of bolster 14 is urged against washer 37 and lifting rail 13 by a plurality of springs 38 disposed between the under side of lifting rail 13 and the heads of bolts 39 threaded into flanged portion 36.

Disposed about spindle 10 at a point above fixed rail 11 is a lubricant reservoir 41 comprising in its preferred form a transparent bell-shaped shell 42, preferably made from glass, cellulose acetate or some like material, sealed into a base 43 secured to a male fitting 44 forming part of a coupling 45. Through the agency of a flexible packing washer 46 and a metal ring 47 held in place upon spindle 10 by means of male fitting 44 and a cooperating female fitting 48, coupling 45 serves to locate reservoir 41 in the desired position axially of the spindle 10. Lock nut 31, which screws onto the threaded portion of spindle 10, is provided with spacer 32 which serves to jam female fitting 44 into place so as to prevent it from becoming loosened.

As previously indicated, bolster 14 includes a sleeve portion 15 which extends above and a butt portion 34 which extends below lifting rail 13. Associated with butt portion 34 of bolster 14 is a lubricant conveying means 49 which, for purposes of illustration, takes the form of an annular container 51. Container 51 is spot welded onto butt portion 34 of bolster 14 in juxtaposition to one or more openings such as ports 53 extending through the outer wall and into the inner bore 52 of the butt portion 34 of bolster 14.

The part of butt portion 34 of bolster 14 extending below conveying means 49 is preferably tapered in the manner shown for the purpose of causing any excess lubricant clinging to the outer surface thereof during the interval in which the apparatus is either in or near the position illustrated in Figure 2 to drain toward spindle 10. In this fashion, the lubricant will run down the spindle and return to lubricant reservoir 41. It is apparent that the butt portion 34 of bolster 14 could, if desired, be given some other suitable shape.

On flanged portion 36 of bolster 14 is mounted a lubricant cup 54 having an upwardly extending internal collar portion 50 which encircles sleeve portion 15 of said bolster 14. Said lubricant cup 54 is held in place on bolster 14 by means of antifriction bearing 18 which engages said collar portion 50 thereof. In the bottom of cup 54 adjacent collar portion 50, a drain hole 56 is provided which is surrounded by a downwardly extending skirt portion 55 cooperating with channel 57 in bolster 14 to locate said cup 54. If desired, cup 54 may conveniently be formed integrally with flanged portion 36 of bolster 14.

In the operation of the device, when lifting rail 13 approaches the lowermost position in its cycle of reciprocation, butt portion 34 of bolster 14 enters reservoir 41 through opening 58 in shell 42. Before coming to rest, it proceeds downward until annular container 51 of conveying means 49 is submerged in the lubricant in reservoir 41. To whatever extent may be necessary, depending upon the amount of lubricant, if any, present in annular container 51, lubricant from reservoir 41 flows in to fill annular container 51 and ports 53 in the wall of butt portion 34 of bolster 14. The lubricant thus caught in container 51 of conveying means 49 is subsequently applied to spindle 10 by means of ports 53 in such manner as to lubricate the bearings between bolster 14 and spindle 10.

This operation is effected as hereinafter outlined by movement of bolster 14 from the position illustrated in Figure 1 to that illustrated in Figure 2.

When, in response to movement of lifting rail 13, bolster 14 is at the uppermost extremity of its reciprocatory cycle, annular container 51 of conveying means 49 is disposed in juxtaposition to one or more recesses 59 formed in the surface of spindle 10. In this position, lubricant from said conveying means 49 flows into said recesses, substantially filling them. Subsequently, bolster 14 recedes in response to downward movement of lifting rail 13, but the lubricant entrapped in recesses 59 remains there until the uppermost edge of sleeve 15 of bolster 14 moves below recesses 59, permitting the lubricant to escape.

After escaping from recesses 59, the lubricant flows by gravity through antifriction bearings 17 and 18 in whirl 16. If desired for the protection of antifriction bearings 17 and 18, means may be employed to prevent the passage of lubricant therethrough until any extraneous matter which may be present in said lubricant has been removed. With this in mind, a filter taking the form, for example, of a porous felt washer 60 surmounting the upper bearing 17 may be employed to filter the lubricant before permitting it to pass through said bearings 17 and 18 on its way to lubricant reservoir 41.

Cup 54, disposed on bolster 14 immediately below bearing 18, temporarily collects the lubricant which passes in this manner through whirl 16. As already mentioned, hole 56 in the base of cup 54 and channel 57 in flanged portion 36 of bolster 14 are aligned with each other and with opening 58 in shell 42 of reservoir 41. When, therefore, the lubricant reaches cup 54, it drains through hole 56 and channel 57, flowing thence over the surface of butt portion 34 of bolster 14 through opening 58 into lubricant reservoir 41. On subsequent reciprocations of the bolster 14, the lubricant is repeatedly recirculated.

Extending downward from and supported by lifting rail 13 is a tubular enclosure 61 which, in its lowermost position, virtually completely surrounds the lower portion of spindle 10. In large part, such tubular enclosure prevents splashing of lubricant from the lubricating mechanism; however, it is intentionally made short enough so that when the lifting rail 13 is in its uppermost position, the amount of lubricant in the reservoir 41 may easily be observed by the operator. Tubular member 61 may be supported from the under side of lifting rail 13 in any convenient manner as, for example, by means of washers 62 inserted between a flange 63 forming part of said enclosure and springs 38 which, together with bolts 39, form part of the previously described resilient mounting for bolster 14.

The structure of Figures 3 to 9, inclusive, is in many respects similar to that of Figures 1 and 2. For instance, it involves a spindle 10 supporting a cap 12 which spindle is resiliently mounted upon fixed rail 11. A bolster 14', which, as will be noted, differs only slightly from its counterpart in the embodiment of the invention shown in Figures 1 and 2, is mounted in like fashion on lifting rail 11 for reciprocation relatively to spindle 10. A whirl 16 is supported as before from bolster 14' by means of antifriction bearings 17 and 18 and is surmounted by bobbin 19 held in place by pins 21.

Mounted about the lower portion of spindle 10 near its mounting upon fixed rail 11 is a vertically extending lubricant reservoir 65. Such lubricant reservoir preferably takes the form of a hollow cylinder having one open end extending upward in such manner as to enable it to receive the lower end of bolster 14'. Coupling 45 serves to support reservoir 65 upon spindle 10 in such manner that, when lifting rail 13 is in the lowermost position of its reciprocatory cycle, a limited amount of lateral clearance is provided between the inner surface of reservoir 61 and the outer surface of bolster 14'. As explained hereinafter, no endwise clearance is provided between bolster 14' and the closed end of lubricant reservoir 65.

Lubricant reservoir 65 in its preferred form comprises a transparent barrel 66 of glass, cellulose acetate or other suitable material cemented, fused or otherwise secured to a base 67 of plastic material which insures a firm bond between barrel 66 and base 67. If desired, a metal receptacle fabricated as a unit may be substituted for the transparent barrel and base herein described; however, the ability to ascertain at any time the quantity of lubricant in the reservoir 65 is a feature of considerable practical importance. Base 67 is secured in any suitable fashion to coupling 45 as, for example, by means of the tongue and groove construction illustrated in Figure 5.

Male fitting 44 of coupling 45, together with packing washer 46 and metal ring 47, forms when threaded into female coupling 48 a leakproof joint preventing any escape of lubricant between spindle 10 and coupling 45. Lock nut 31, which screws onto the threaded portion of spindle 10, is provided with a spacer 32 which assists in locating reservoir 65 in its proper position axially of spindle 10. It also serves to jam female fitting 48 into place, thereby preventing it from becoming loosened, whether as a result of vibration of the spindle assembly as a whole or of the high pressures developed within the reservoir 65 when the device is in operation.

To butt portion 34 of bolster 14' is secured a piston 69 which has an internal bore 71 extending longitudinally thereof which bore is of a diameter slightly larger than the diameter of spindle 10. A hollow cylinder 73 disposed with its open end extending downward is slidably mounted upon shank 72 of piston 69 in such fashion that lip portion 74 at the other end thereof is adapted to engage a shoulder 75 on piston 69. A spring 76 is disposed between butt portion 34 of bolster 14' and lip portion 74 of cylinder 73 for the purpose of urging lip portion 74 into engagement with shoulder 75. The internal diameter of cylinder 73 is slightly larger than the external diameter of piston 69 so as to insure a tight yet slidable fit between the two.

The relationship of these parts is such that when lifting rail 13 approaches the lowermost position of its reciprocatory cycle, piston 69, cylinder 73, spring 76 and butt portion 34 of bolster 14' enter the open end of lubricant reservoir 65. A flexible washer 78 is provided upon base 67 of reservoir 65, the purpose of which is to produce a cushioning effect on and to form a seal for the open end of cylinder 73 which comes into contact with the base 67 of reservoir 65 when lifting rail 13 is in the position represented in Figure 5 of the drawings. In such position, lip portion 74 of cylinder 73 is out of engagement with shoulder 75 of piston 69.

In the wall of cylinder 73 is provided a plurality of holes 77 permitting the passage of lubricant therethrough for purposes hereinafter to be described.

In the flanged portion 36 of bolster 14' is formed a shallow lubricant receptacle 79. Communicating with said receptacle 79 and bore 71 of piston 69 is a channel 81. Disposed preferably a quarter of the way around spindle 10 from channel 81 is an angularly extending lubricant pocket 82 running from the bottom of receptacle 79 to bore 52 of bolster 14'. Completely surrounding the lowermost edge of whirl 16 is a shield 83 which is sprung into place in a shoulder 84 formed in receptacle 79.

Shield 83 serves not only to prevent the entrance of dirt, dust and other extraneous matter into the lubricant contained in receptacle 79, but also to eliminate the splashing of lubricant therefrom during the operation of the apparatus. As a precautionary measure against the throwing of lubricant by the rapidly rotating whirl 16, a deflector ring 85 provided with a single downwardly extending tab portion 91 mounted below antifriction bearing 18 is employed. Tab portion 91 of deflector ring 85 is preferably positioned above the upper end of channel 81 and operates to prevent the lubricant forced therethrough by the operation of piston 69 from spurting against the under side of bearing 18.

A filter which preferably takes the form of a porous washer 86 surmounts upper bearing 17, serving to filter out any dust or dirt particles which may inadvertently enter the lubricant.

As in the previously described embodiment of the invention, an enclosure 87 may be employed to house the lubricating mechanism. Said enclosure 87 is conveniently made of such length that it will extend just below the top edge of barrel 66 of lubricant reservoir 65 when lifting rail 13 is at the uppermost limit of its reciprocatory cycle. This arrangement insures protection against contamination of the lubricant, prevents the operator from unnecessary contact with moving parts, and permits the level of lubricant in lubricant reservoir 65 to be observed.

One or more holes, such as that indicated by reference character 88, may advantageously be provided in enclosure 87. It has been found that the supply of lubricant in receptacle 65 may be replenished without stopping the machine as a whole by injecting lubricant through hole 88 during the interval when lifting rail 13 is in such position that hole 88 is above the upper edge of barrel 66 of lubricant reservoir 65.

When lifting rail 13 is in its uppermost position, lubricant pocket 82 in bolster 14' is in juxtaposition to a cooperating lubricant opening formed in spindle 10. Such lubricant opening is preferably formed by cutting keyways 89 on either side of spindle 10 directly opposite each other and connecting them by means of a hole 90 drilled transversely of the spindle. When formed in this manner, the lubricant opening is adapted to receive from pocket 82 substantially all of the lubricant therein contained and, as hereinafter explained, to discharge it freely when bolster 14' is in the proper position.

The modus operandi of the apparatus may best be understood by assuming that the device is starting operation from the position illustrated in Figure 4 of the drawings, in which lifting rail 13 is at the uppermost extremity of its reciprocatory cycle. In this position, pocket 82 in bolster 14' communicates with the lubricant opening comprising keyways 89 and hole 90 in spindle 10. Furthermore, lip portion 74 of cylinder 73 is urged by spring 76 into engagement with shoulder portion 75 of piston 69. As will be apparent from the description which follows, it is in this relationship of the elements that lubricant entrapped in pocket 82 of bolster 14' by previous operation of the apparatus drains into openings 89, 89 and 90 of spindle 10.

As lifting rail 13 begins its descent, the inner bore 52 of bolster 14' comes into contact with the lubricant held within openings 89, 89 and 90 and is thus lubricated. When lifting rail 13 has descended to a point at which the uppermost edge of sleeve portion 15 of bolster 14' is opposite openings 89, 89 and 90, the lubricant remaining therein is discharged. The discharged lubricant passes through porous washer 86 and antifriction bearing 17 to the inside of whirl 16, thence through bearing 18 into receptacle 79 in flanged portion 36 of bolster 14', and finally out through channel 81 and bore 71 of piston 69 to lubricant reservoir 65.

As lifting rail 13 continues to descend, the lower edge of cylinder 73 contacts washer 78 on base 67 of reservoir 65. When brought into contact with washer 78, cylinder 73 entraps therein a portion of the lubricant contained in reservoir 65. Lifting rail 13 in continuing its descent now causes lip portion 74 of cylinder 73 and butt portion 34 of bolster 14' to compress spring 76 between them. Meanwhile, piston 69 starts downward within cylinder 73 and the lubricant entrapped therein is displaced by being forced upward within bore 71 of said piston through channel 81, thus filling receptacle 79 and pocket 82 in bolster 14'.

When piston 69 is in its lowermost position with respect to cylinder 73, the previously described holes 77 in the wall of said cylinder admit a portion of the lubricant above said piston to lubricate the surfaces thereof.

While lifting rail 13 begins to retrace its path toward the upper limit of its reciprocatory cycle, all of the lubricant except that retained in pocket 82 drains out of receptacle 79 in bolster 14', escaping through channel 81 and bore 71 of piston 69 and returning to reservoir 65. The lubricant in draining back to reservoir 65 thus comes into contact with spindle 10 and provides additional lubrication for bore 52 of bolster 14' and its associated parts.

In the two embodiments of the invention hereinabove described, little or none of the lubricant is lost through leakage or splashing during the operation of the apparatus. No dust, dirt or other foreign matter can get into the lubricant to damage the moving parts. Positive lubrication of the rapidly moving elements of the apparatus is provided at all times. Obviously, however, many modifications may be made therein without in any way departing from the spirit of the invention.

It is intended that the patent shall cover, by suitable expression in the appended claims, whatever features of patentable novelty reside in the invention.

What is claimed is:

1. Means for lubricating a mechanism including a shaft about which is disposed, for reciprocation with respect thereto, a sleeve upon which is rotatably mounted a member capable of rotation about the axis of said shaft comprising a lubricant reservoir mounted upon the shaft; at least one opening in the shaft; means operating through the agency of said sleeve for supplying lubricant to the shaft during relative reciprocation of said shaft and said sleeve and transmitting a portion of the lubricant from the lubricant reservoir to the opening in the shaft; and means for effecting lubrication of the bearing surfaces of the member rotatably mounted on said sleeve while directing the lubricant back to the lubricant reservoir.

2. Means for lubricating a mechanism including a shaft about which is disposed, for reciprocation with respect thereto, a sleeve upon which is rotatably mounted a member capable of rotation about the axis of said shaft comprising a lubricant reservoir mounted upon the shaft; means associated with the sleeve for accepting a portion of the lubricant from the lubricant reservoir as the sleeve approaches one of the extremities of its reciprocatory motion with respect to said shaft; an opening in the shaft which communicates with and drains the lubricant from said means associated with said sleeve as the sleeve approaches the other extremity of its reciprocatory motion with respect to said shaft; means for effecting lubrication of the bearing surfaces by which the rotatably mounted member is supported from said sleeve; and means for directing the lubricant back to the lubricant reservoir.

3. Twisting apparatus comprising a substantially vertical spindle; a bolster mounted about and reciprocable relatively to said spindle; a whirl carried by said bolster; bearing means upon the bolster by means of which said whirl is rotatably mounted; a lubricant reservoir mounted upon the spindle below the bolster; means operatively associated with the bolster during the relative reciprocation of said bolster and said spindle for conducting lubricant from said reservoir to said bearing means; and means for directing the lubricant back to the lubricant reservoir.

4. Means for lubricating a mechanism including a shaft about which is disposed, for reciprocation with respect thereto, a sleeve upon which is mounted a member capable of rotation about the axis of said shaft comprising a lubricant reservoir mounted upon the shaft; means operatively associated with the sleeve during the relative reciprocation between said sleeve and said shaft for conducting lubricant from the lubricant reservoir to the bearing surfaces between said rotatably mounted member and said sleeve; and means for directing the lubricant back to said lubricant reservoir.

5. Means for lubricating a mechanism including a shaft about which is disposed, for reciprocation with respect thereto, a sleeve upon which is mounted a member capable of rotation about the axis of said shaft comprising a lubricant reservoir mounted upon the shaft; at least one recess in the shaft; means associated with said sleeve operating by virtue of the relative reciprocation between the sleeve and the shaft to accept lubricant from the lubricant reservoir, supply a portion of said lubricant to the shaft, and transmit the remainder of said lubricant to the recess in said shaft; and means for effecting the lubrication of the bearing surfaces between the rotatably mounted member and the sleeve and simultaneously directing the lubricant back to the lubricant reservoir.

6. Means for lubricating a mechanism including a shaft about which is disposed, for reciprocation with respect thereto, a sleeve upon which is supported a member capable of rotation about the axis of said shaft comprising a lubricant reservoir mounted upon the shaft; conveying means forming part of said sleeve for accepting a portion of the lubricant from the lubricant reservoir as the sleeve approaches one of the extremties of its reciprocatory motion with respect to said shaft; one or more recesses in said shaft which communicate with and drain said lubricant from said conveying means as the sleeve approaches the other extremity of its reciprocatory motion with respect to said shaft; means for effecting lubrication of the means by which the rotatably mounted member is supported from said sleeve; and means for directing the lubricant back to the lubricant reservoir.

7. Means for lubricating a mechanism of the character described in claim 5 in which is provided shielding means disposed about the lower portion of the sleeve in such manner that the lubricant reservoir is substantially fully enclosed throughout the entire cycle of reciprocation of the sleeve with respect to the shaft.

8. Twisting apparatus comprising an upright spindle; a bolster mounted about and reciprocable with respect to said spindle; a whirl carried by said bolster; bearing means by which said whirl is rotatably mounted upon said bolster; a lubricant reservoir mounted upon the spindle; at least one recess in said spindle; means associated with the bolster operating by virtue of the relative reciprocation of the bolster and the spindle to receive lubricant from the lubricant reservoir, supply a portion of the lubricant to the bore of the bolster so as to lubricate the spindle and transmit the remainder of said lubricant to the recess in the spindle; and means for effecting the lubrication of the bearing means by which the whirl is supported from the bolster while directing the lubricant back to the lubricant reservoir.

9. Twisting apparatus comprising an upright spindle; a bolster mounted about and reciprocable with respect to said spindle; a whirl carried by said bolster; bearing means by which said whirl is rotatably supported from said bolster; a lubricant reservoir mounted upon the spindle below the bearing means; conveying means forming part of the bolster for accepting a portion of the lubricant from the lubricant reservoir as the bolster approaches one of the extremities of its reciprocatory motion with respect to said spindle; one or more recesses in said spindle which communicate with and drain said lubricant from said conveying means as the bolster approaches the other extremity of its reciprocatory motion with respect to said spindle; means for effecting the lubrication of the bearing means by which the whirl is supported from the bolster; and means for directing the lubricant back to the lubricant reservoir.

10. Means for lubricating a mechanism including a shaft about which is disposed, for reciprocation with respect thereto, a sleeve upon which is rotatably mounted a member capable of rotation about the axis of said shaft comprising a lubricant reservoir mounted upon the shaft; piston means fixed to the sleeve; means resiliently mounted about the piston means for entrapping therein a portion of the lubricant in said reservoir when said piston means is introduced thereto as the sleeve approaches one of the extremities of its reciprocatory motion; lubricant receiving means associated with said sleeve; means cooperating with the piston means for conducting lubricant displaced by said piston means to said lubricant receiving means; an opening in said shaft which communicates with and drains the lubricant from said lubricant receiving means as the sleeve approaches the other extremity of its reciprocatory motion; and means for effecting lubrication of the bearing surfaces of the member rotatably mounted on said sleeve while directing the lubricant back to the lubricant reservoir.

11. Means for lubricating a mechanism of the character described in claim 10 in which the piston means depend from the sleeve for reciprocation in a substantially vertical direction.

12. Means for lubricating a mechanism of the character described in claim 10 in which the piston means is provided with an internal channel through which the lubricant displaced by said piston means is conducted to the lubricant receiving means associated with the sleeve.

13. Means for lubricating a mechanism of the character described in claim 10 in which is provided shielding means disposed about the lower portion of the sleeve in such manner that the lubricant reservoir is substantially fully enclosed throughout the entire cycle of reciprocation of the sleeve with respect to the shaft.

14. Means for lubricating a mechanism of the character described in claim 10 in which is provided shielding means disposed about the lower portion of the sleeve in such manner that the lubricant reservoir is substantially fully enclosed throughout the entire cycle of reciprocation of the sleeve with respect to the shaft and means associated with said shielding means of such character that the supply of lubricant in the lubricant reservoir may be replenished without interrupting the continuous operation of the mechanism.

15. Means for lubricating a mechanism of the character described in claim 10 in which the member rotatably mounted upon the sleeve is supported therefrom by one or more bearing means and means disposed between the bearing means and the lubricant receiving means associated with the sleeve for preventing the splashing of the lubricant from said lubricant receiving means resulting from the surge imparted to said lubricant by the operation of the piston means.

16. Twisting apparatus comprising an upright spindle; a bolster mounted about and reciprocable relatively to said spindle; a whirl carried by said bolster; bearing means upon said bolster by means of which said whirl is rotatably mounted; a lubricant reservoir mounted upon said spindle below said bolster; a piston depending from said bolster; means resiliently mounted about said piston for entrapping therein at least a portion of the lubricant contained in said reservoir as the bolster approaches its lowermost position; a recess in said bolster; means associated with said piston for conducting to said recess a portion of the lubricant displaced by said piston; an opening extending substantially transversely of said spindle which communicates with and drains the lubricant from said recess in said bolster as the latter approaches its uppermost position, said opening being adapted to discharge lubricant to said bearing means as said bolster again approaches its lowermost position; and means for directing such discharged lubricant back to said lubricant reservoir.

17. Twisting apparatus of the type claimed in claim 16 in which is provided shielding means disposed about the lower portion of the bolster in such manner that the lubricant reservoir is substantially fully enclosed throughout the entire cycle of reciprocation of said bolster with respect to the spindle.

18. Twisting apparatus of the character described in claim 16 in which is provided shielding means disposed about the lower portion of the bolster in such manner that the lubricant reservoir is substantially fully enclosed throughout the entire cycle of reciprocation of said bolster with respect to the spindle; and means associated with said shielding means of such character that the supply of lubricant in the lubricant reservoir can be replenished without interrupting the continuous operation of the apparatus.

19. Twisting apparatus of the character described in claim 16 in which is provided means disposed between the bearing means by which the whirl is rotatably supported on the bolster and the recess in the bolster for preventing the splashing of lubricant from said recess resulting from the surge imparted to said lubricant by the operation of the piston.

RICHARD F. BERGMANN.
CLARENCE C. WALTERS.